US007428421B2

(12) United States Patent
Jain et al.

(10) Patent No.: US 7,428,421 B2
(45) Date of Patent: Sep. 23, 2008

(54) METHOD AND APPARATUS FOR CONGESTION CONTROL IN A WIRELESS COMMUNICATION SYSTEM

(75) Inventors: Avinash Jain, San Diego, CA (US); Jack M. Holtzman, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 11/250,001

(22) Filed: Oct. 12, 2005

(65) Prior Publication Data

US 2006/0030345 A1 Feb. 9, 2006

Related U.S. Application Data

(63) Continuation of application No. 09/877,917, filed on Jun. 7, 2001, now Pat. No. 6,983,153.

(51) Int. Cl.
*H04B 17/00* (2006.01)
*H04B 7/00* (2006.01)

(52) U.S. Cl. ...................... 455/515; 455/67.7

(58) Field of Classification Search ................ 455/453, 455/67.11, 67.13, 67.7, 68–69, 450–452.2, 455/456.1, 422.1, 462–464, 439, 512–513, 455/420–424, 436, 418, 509, 480, 445, 501, 455/522, 292, 245.1; 370/342, 335, 250, 370/236
See application file for complete search history.

(56) References Cited

U.S. PATENT DOCUMENTS 5,101,501 A * 3/1992 Gilhousen et al. .......... 455/442
5,727,033 A * 3/1998 Weaver et al. .............. 375/358
5,745,520 A * 4/1998 Love et al. ................. 375/130
5,878,098 A * 3/1999 Wang et al. ................ 375/377
5,978,428 A * 11/1999 Hayashi ..................... 375/377

(Continued)

FOREIGN PATENT DOCUMENTS

EP         0959582         11/1999

(Continued)

OTHER PUBLICATIONS

Kim, et al. "Combined Power Control and Transmission Rate Selection in Cellular Networks" VTC 1999-IEEE VTS 50th vol. 3, Conf. 50: Sep. 19, 1999.

(Continued)

*Primary Examiner*—Pablo N Tran
(74) *Attorney, Agent, or Firm*—Kam T. Tam; Kam T. Tam; Thomas R. Rouse

(57) ABSTRACT

Method and apparatus for congestion control in a wireless communication system. In one embodiment, the status of a congestion bit indicates the type of adjustment, such as increase or decrease, to be performed at an access terminal to determine the next data rate for transmissions on the reverse link. The status of the congestion bit is determined by comparing a congestion parameter to a predetermined threshold. One embodiment implements an outerloop threshold having a margin with respect to the desired congestion metric threshold. The outerloop threshold is adjusted in response to comparing a measured congestion metric to the desired threshold. The outerloop threshold adjustment maintains the congestion metric to within a predetermined probability of exceeding the desired threshold.

26 Claims, 9 Drawing Sheets

U.S. PATENT DOCUMENTS

| | | | |
|---|---|---|---|
| 6,108,374 A * | 8/2000 | Balachandran et al. | 375/227 |
| 6,278,882 B1 * | 8/2001 | Choi | 455/453 |
| 6,317,435 B1 * | 11/2001 | Tiedemann et al. | 370/441 |
| 6,324,172 B1 | 11/2001 | Pankaj | |
| 6,404,826 B1 * | 6/2002 | Schmidl et al. | 375/340 |
| 6,426,971 B1 * | 7/2002 | Wu et al. | 375/227 |
| 6,456,850 B1 * | 9/2002 | Kim et al. | 455/453 |
| 6,519,462 B1 * | 2/2003 | Lu et al. | 455/453 |
| 6,563,810 B1 | 5/2003 | Corazza | |
| 6,564,966 B2 | 5/2003 | Kaiga et al. | |
| 6,567,420 B1 * | 5/2003 | Tiedemann et al. | 370/468 |
| 6,574,211 B2 | 6/2003 | Padovani et al. | |
| 6,597,923 B1 * | 7/2003 | Vanghi et al. | 455/522 |
| 6,639,934 B1 * | 10/2003 | Engstrom et al. | 375/130 |
| 6,665,272 B1 | 12/2003 | Pankaj et al. | |
| 6,909,880 B2 | 6/2005 | Kojima et al. | |
| 6,985,739 B2 * | 1/2006 | Spaling et al. | 455/453 |
| 7,027,401 B1 * | 4/2006 | Ozegovic | 370/236 |
| 7,054,391 B2 * | 5/2006 | Thesling | 375/340 |
| 7,072,306 B2 * | 7/2006 | Blessent | 370/252 |
| 7,085,581 B2 * | 8/2006 | Vanghi | 455/522 |
| 7,215,654 B2 * | 5/2007 | Tiedemann et al. | 370/329 |
| 7,221,653 B2 * | 5/2007 | Vanghi | 370/252 |
| 2002/0034170 A1 * | 3/2002 | Tiedemann et al. | 370/335 |
| 2002/0077111 A1 | 6/2002 | Spaling et al. | |
| 2002/0119796 A1 * | 8/2002 | Vanghi | 455/522 |
| 2002/0141349 A1 * | 10/2002 | Kim et al. | 370/252 |
| 2002/0154610 A1 * | 10/2002 | Tiedemann et al. | 370/329 |
| 2002/0186657 A1 | 12/2002 | Jain et al. | |
| 2003/0125037 A1 * | 7/2003 | Bae et al. | 455/450 |
| 2006/0233110 A1 * | 10/2006 | Yang et al. | 370/237 |

FOREIGN PATENT DOCUMENTS

| | | |
|---|---|---|
| EP | 959582 | 11/1999 |
| EP | 1067729 | 1/2001 |
| EP | 1077580 | 2/2001 |
| EP | 1231807 | 8/2002 |
| WO | 99045735 | 9/1999 |
| WO | 00049824 | 8/2000 |

OTHER PUBLICATIONS

Sampath, Ashwin "Access Control of Data in Integrated Voice/Data CDMA Systems: Benefits and Tradeoff" Communications 15(8): 1511-1526 (1997).

International Search Report, PCT/US02/017815, International Search Authority, European Patent Office, Sep. 24, 2002.

* cited by examiner

METHOD AND APPARATUS FOR CONGESTION CONTROL IN A WIRELESS COMMUNICATION SYSTEM

CLAIM OF PRIORITY UNDER 35 U.S.C. §120

The present Application for Patent is a Continuation and claims priority to patent application Ser. No. 09/877,917 entitled "Method and Apparatus for Congestion Control in a Wireless Communication System" filed Jun. 7, 2001, now U.S. Pat. No. 6,983,153, and assigned to the assignee hereof and hereby expressly incorporated by reference herein.

REFERENCE TO CO-PENDING APPLICATIONS FOR PATENT

The present Application for Patent is related to "METHOD AND APPARATUS FOR CONGESTION CONTROL IN A WIRELESS COMMUNICATION SYSTEM," by Avinash Jain et al., filed Jun. 7, 2001, having application Ser. No. 09/877,820 assigned to the assignee hereof;

"METHOD OF RATE ALLOCATION IN A DATA COMMUNICATIONS NETWORK," by Rajesh Pankaj, filed Mar. 4, 1999, having application Ser. No. 09/264,297, assigned to the assignee hereof and hereby expressly incorporated by reference;

"SYSTEM AND METHOD FOR PERSISTENCE VECTOR BASED MODIFICATION OF USAGE RATES," by Rajesh Pankaj et al., having application Ser. No. 09/410,204, filed Sep. 30, 1999, assigned to the assignee hereof and hereby expressly incorporated by reference; and "CLOSED LOOP RESOURCE ALLOCATION," by Giovanni Corazza et al., having application Ser. No. 09/409,981, filed Sep. 30, 1999, assigned to the assignee hereof, and hereby expressly incorporated by reference.

BACKGROUND

1. Field

The present invention relates to communications systems. Specifically, the present invention relates to methods and apparatus for congestion control in a wireless communication system.

2. Background

In a wireless communication system, a base station communicates with multiple mobile users. Wireless communications may include low delay data communications, such as voice or video transmissions, or high data rate communications, such as packetized data transmissions. U.S. patent application Ser. No. 08/963,386, entitled "METHOD AND APPARATUS FOR HIGH RATE PACKET DATA TRANSMISSION," filed Nov. 3, 1997 describes high rate packet data transmissions, and hereby expressly incorporated by reference.

In a wireless communication system, and specifically a system adapted for packetized transmissions, congestion and overloading may reduce the throughput of the system. Congestion is a measure of the amount of pending and active traffic with respect to the rated capacity of the system. System overload occurs when the pending and active traffic exceeds the rated capacity. A system may implement a target congestion level to maintain traffic conditions without interruption, i.e., to avoid overloading and underloading of resources.

One problem with overloading is the delayed transmission responses. An increase in response time often leads to application level timeouts, wherein an application requiring the data waits longer than the application is programmed to allow. Applications will then needlessly resend messages on timeouts, causing further congestion. If this condition continues, the system might reach a condition where it can service no users. Thus, in absence of any congestion control, the system will perform much below its rated capacity. There is a need therefore for congestion control that increases the efficiency of a wireless system and reduces the probability of overloading or a fault.

SUMMARY

Embodiments disclosed herein address the above stated needs by providing an efficient method of congestion control that determines a congestion indicator by comparison of a measured congestion metric against a threshold, wherein the threshold uses an outerloop threshold having a margin with respect to a desired threshold. According to one aspect, a method for generating a congestion indicator includes determining an outerloop threshold as a function of a desired threshold, measuring a congestion metric, comparing the congestion metric to the desired threshold, and updating the outer loop threshold in response to comparing the measured congestion metric to the desired threshold.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

A mobile subscriber station, referred to herein as an Access Terminal, AT, may be mobile or stationary, and may communicate with one or more base stations. An access terminal transmits and receives data packets through one or more modem pool transceivers to a base station controller, referred to herein as a Modem Pool Controller, MPC. Modem pool transceivers and modem pool controllers are parts of a network called the Access Network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. Note that an access network may consist of a base station, wherein the base station is adapted for communication with a plurality of access terminals and a base station controller.

An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Figure 1:
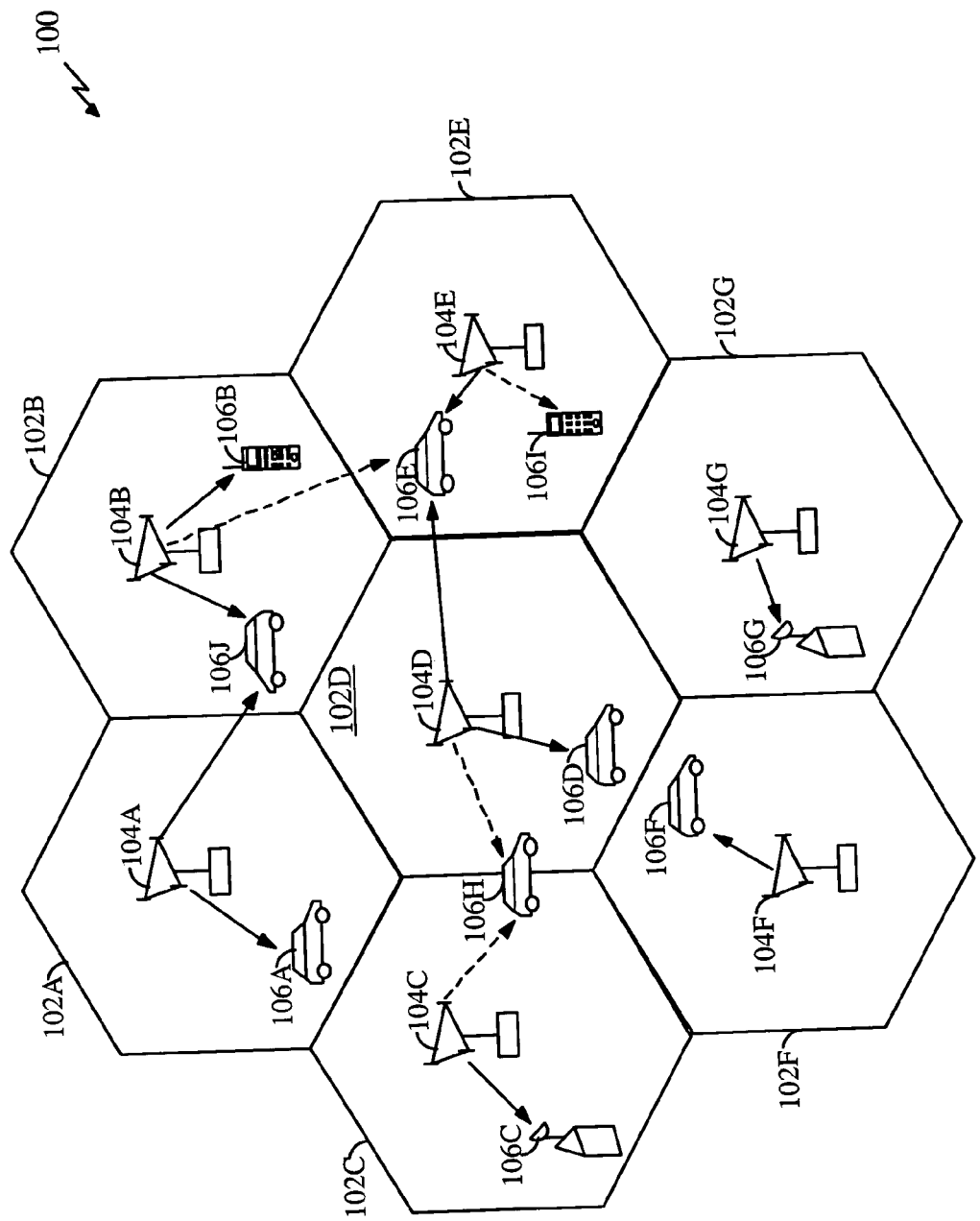
FIG. 1 is a wireless communication system.

FIG. 1 is a diagram of a communications system 100 that supports a number of users and is capable of implementing at least some aspects and embodiments of the invention. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "METHOD AND SYSTEM FOR PROVIDING A SOFT HANDOFF IN A CDMA CELLULAR TELEPHONE SYSTEM", which is assigned to the assignee of the present invention and incorporated by reference herein.

The downlink refers to transmission from the base station to the terminal, and the uplink refers to transmission from the terminal to the base station. In the exemplary embodiment, some of terminals 106 have multiple receive antennas and others have only one receive antenna. Similarly, some of terminals 106 have multiple transmit antennas, and others have single transmit antennas. There are no restrictions on the combinations of transmit antennas and receive antennas. Therefore, it is possible for a terminal 106 to have multiple transmit antennas and a single receive antenna or to have multiple receive antennas and a single transmit antenna or to have both single or multiple transmit or receive antennas. In FIG. 1, base station 104A transmits data to terminals 106A and 106J on the downlink, base station 104B transmits data to terminals 106B and 106J, base station 104C transmits data to terminal 106C, and so on.

In a wireless communication system, such as system 100 of FIG. 1, wherein the system is adapted for packetized transmissions, congestion and overloading may reduce the throughput of the system. Further, in a wireless communication system adapted for a mixture of both voice and data type traffic, overloading in a cell may lead to dropped calls and serious degradation in voice capacity.

Congestion control is often necessitated to account for autonomous traffic which is not well estimated by a system. A congestion control system in a wireless communication system typically monitors various factors like channel or link occupancy, messaging delay, number of users, etc.. Based on these factors a decision is made to control congestion when the system is overloaded, i.e. above a congestion criteria threshold. For an overloaded condition, the system may initiate actions to reduce the load by rejecting traffic and/or adjusting data transmission rates. A given system may have a target congestion level such that when the traffic load of the system is approximately at the target congestion level, the system maintains current traffic conditions. If the system gets under loaded, the traffic conditions are adjusted as well.

Congestion is a measure of the amount of pending and active traffic with respect to the rated capacity of the system. System overload occurs when the pending and active traffic exceeds the rated capacity. Overloading may be due to too many active users or high amounts of pending data per transmission. One problem with overloading is the delayed transmission responses. An increase in response time often leads to application level timeouts, wherein an application requiring the data waits longer than the application is programmed to allow. Applications will then needlessly resend messages on timeouts, causing further congestion. If this condition continues the system might reach a condition where it can service no users. Thus in absence of any congestion control, the system will perform much below its rated capacity, without even considering the handling the excess traffic.

Congestion control seeks to keep the system running approximately at a target or rated capacity. One method of congestion control restricts the number of users that have access to service. In one embodiment, congestion control provides satisfactory service to a small percentage of users rather than give highly degraded service to all the users. The users that access service leave the system after completion of service, thus reducing the loading on the system and allowing a different set of users access to service. It is a goal of such a system all users will have access to at least some level of service from the system for at least some portion of time.

The level of congestion in a system may be determined by monitoring the data rates of pending and active users, and the received signal strength required to achieve a desired quality of service. In a CDMA wireless system, the RL capacity is interference-limited. One measure of the cell/sector congestion is the total received power at the base station. A ratio of the total received power at the base station to the thermal noise gives a normalized measure of the congestion and is referred to as Rise-Over-Thermal, ROT. The ROT is limited for dynamic range limitations. Another variant of ROT is the total cell-load. The cell-load contribution due to each access terminal in communication with the base station may be measured by the signal-to-interference power ratio.

Additionally, the timing of congestion control action impacts the operation of the system. If congestion control is introduced too early, traffic may be rejected that could have been processed. Similarly, if congestion control is delayed too long, the system may become inoperative due to heavy traffic.

Figure 2:
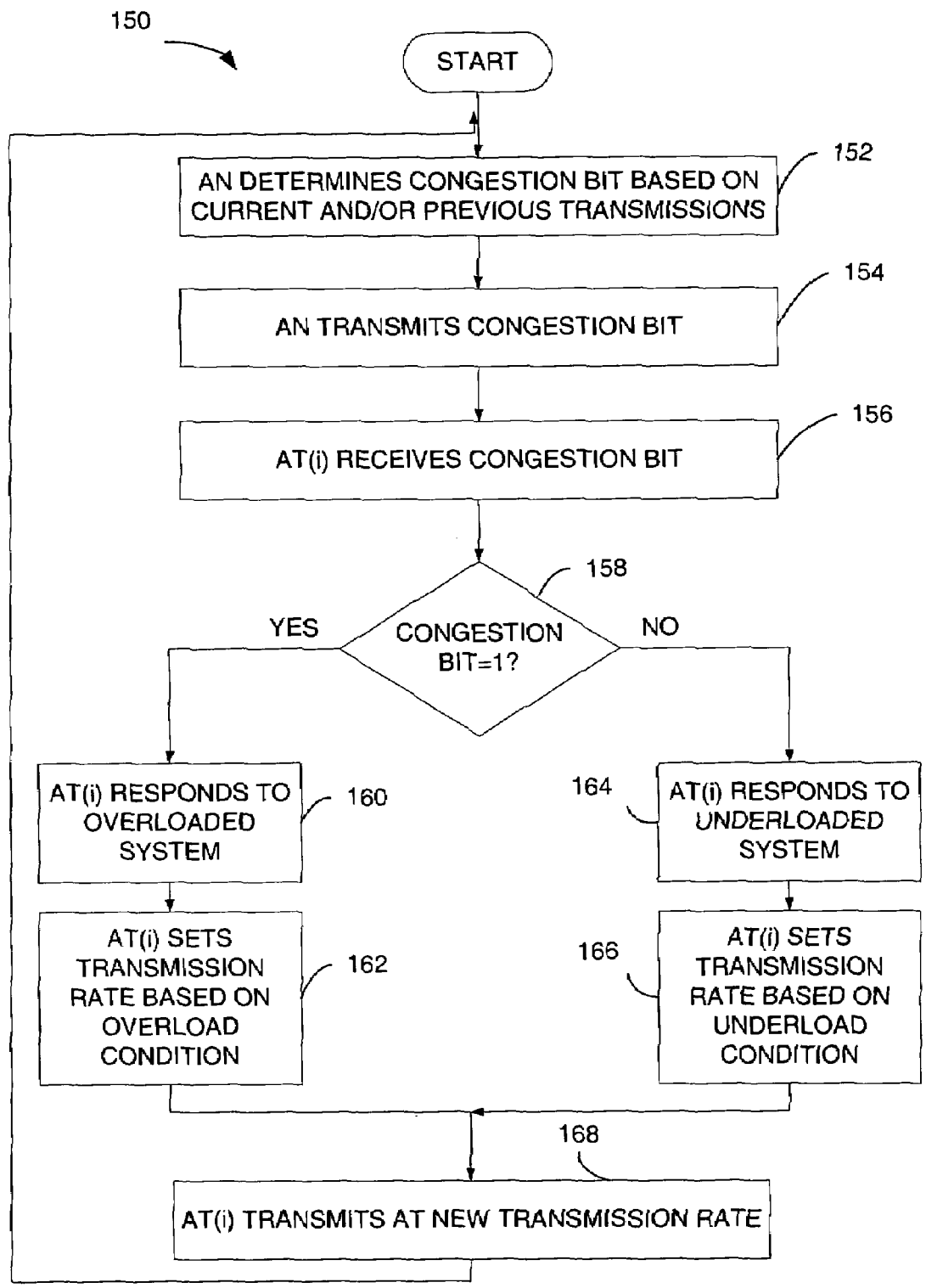
FIG. 2 is a flow chart of a method of congestion control at an access network in a wireless communication system adapted for packetized transmission.

FIG. 2 illustrates a method 150 of congestion control applicable to a wireless communication system, and specifically a communication system adapted for packetized transmissions.

The method 150 is performed at an access network, such as a base station, or a base station controller. The method starts by determining a congestion level and a corresponding Congestion Bit, CB, at step 152. The congestion level may be determined by a congestion metric, such as the average data rate of all users, or ROT, etc. The term Congestion Bit or CB is used throughout this discussion as referring to a congestion indicator that is transmitted from the access network to access terminals indicating a congestion level of the system. According to one embodiment, the CB is a single bit with significance indicated by polarity. A logical one, i.e., the bit is set, indicates the system is congested and/or overloaded, and thus efficient, accurate operation requires a corresponding adjustment of Reverse Link, RL, data rate(s). A logical zero, i.e. the bit is cleared, indicates the system is not congested and may be underloaded, and thus efficient operation suggests an adjustment of the RL data rate(s). Alternate embodiments may implement an alternate polarity scheme.

Similarly, other embodiments may implement a code word or a multiple bit congestion indicator, wherein additional information regarding the level of congestion may be provided to the access terminals. For example, multiple bits may designate varying degrees of congestion from severe to mild. Each access terminal then makes a decision based on the level of congestion. According to such a multiple bit scheme, access terminals may be prioritized or classified, wherein a high priority access terminal only performs rate adjustment for a severe congestion condition, and a lower priority access terminal may be instructed to adjust the data rate at a less severe congestion level. The prioritization may be a function of the type of transmission, or the service accessed by the access terminal, or any other criteria specific to the system.

Still other embodiments may transmit a dedicated signal to indicate a congestion condition or level. One embodiment only transmits the congestion information if the system is in overload. An alternate embodiment only transmits the congestion information if the system is underloaded, wherein access terminals assume the system is overloaded unless they receive information otherwise. Still other embodiments may set the congestion bit when the system is nearing overload, wherein a margin is used to apply a conservative control scheme. A variety of mechanisms may be used to indicate congestion.

Continuing with FIG. 2, the determination of a congestion bit at step 152 may be based on a current congestion condition as determined by a congestion metric, or may consider historical conditions. The inclusion of past data allows for smooth control decisions. At step 154 the access network transmits the CB to access terminal(s).

Each access terminal in communication with the access network uses the congestion bit information for control of a RL transmission data rate. At step 156 each access terminal, AT(i), receives and evaluates the transmitted CB. At decision diamond 158 if CB is set, i.e. CB=1, processing continues to step 160 to respond to an overload condition. The access terminal then determines a RL transmission rate consistent with resolving the overload condition at step 162. For example, according to one embodiment, when the CB is set, each access terminal will lower the transmission data rate. Again at decision diamond 158 if CB is cleared, i.e. CB=0, processing continues to step 164 to respond to an underload condition. The access terminal then determines a RL transmission rate consistent with resolving the underload condition at step 166. For example, according to one embodiment, when the CB is cleared, each access terminal will raise the transmission data rate. Finally, at step 168 each access terminal transmits at an adjusted rate and processing returns to step 152 to await a next congestion bit.

The access network periodically determines the congestion information or level. A congestion metric is measured and compared to a congestion threshold, wherein the congestion threshold may be a function of the rated capacity of the system. The congestion bit then indicates whether the system is operating with a congestion level above or below the threshold.

Figure 3:
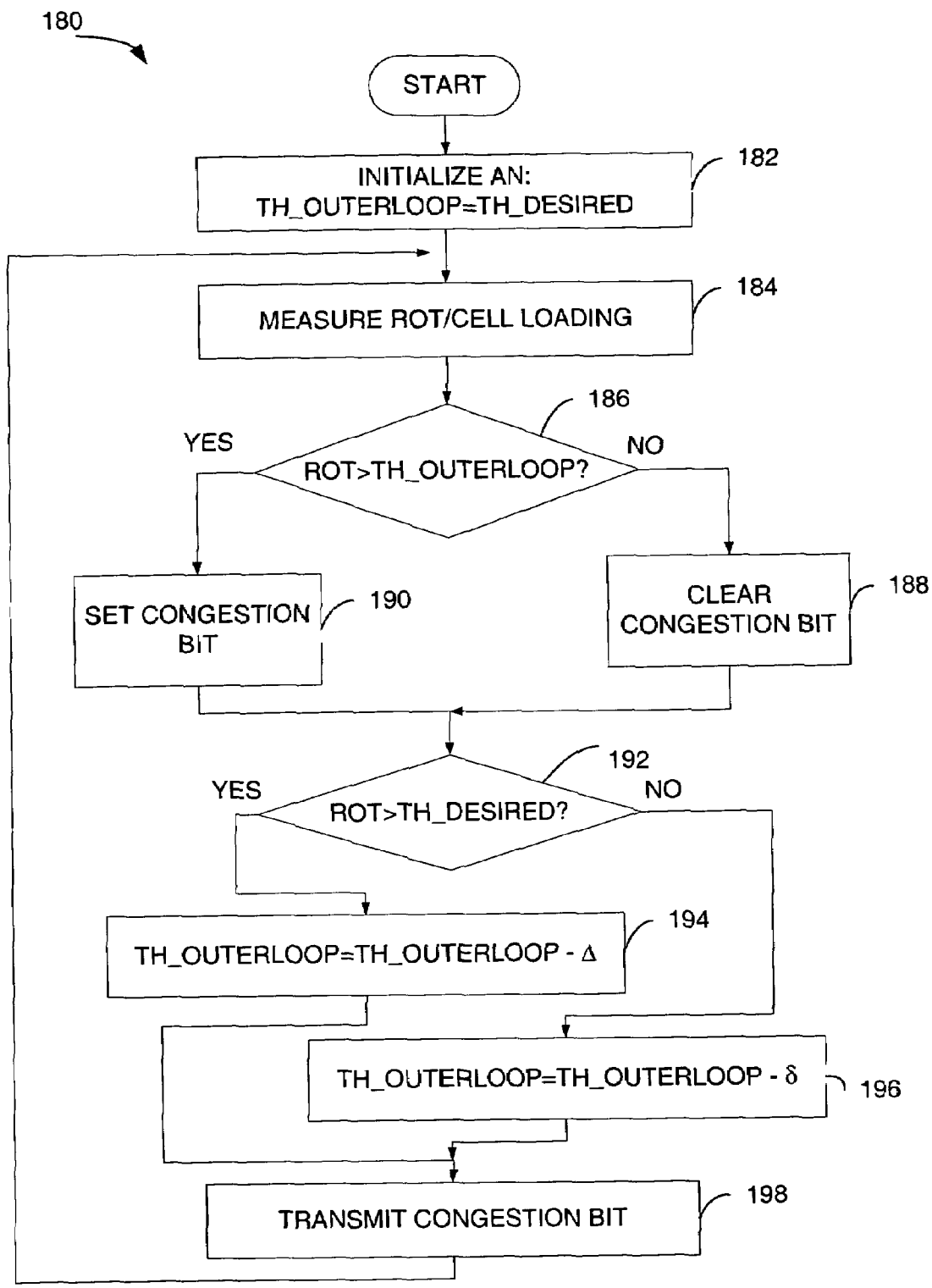
FIG. 3 is a flow chart of a method of making a congestion control decision in a wireless communication system adapted for packetized transmission.

FIG. 3 illustrates an outerloop method 180 for an access network to determine a congestion threshold, wherein outerloop refers to the process of adjusting the threshold and innerloop refers to the use of the threshold in determining a congestion condition. The CB is then set according to a comparison of the measured congestion metric and the outerloop threshold. The outerloop threshold will be referred to herein as "TH_OUTERLOOP." Processing starts at step 182 by initializing the outerloop threshold to a desired threshold, referred to herein as "TH_DESIRED." The desired threshold is by the access network. At step 184 the access network measures a congestion metric of the system. According to one embodiment, the congestion metric is a measure of function of Rise Over Thermal, ROT, which is defined as the ratio of the total power received to thermal noise. An alternate embodiment uses a metric related to cell loading. A variety of metrics may be used to determine a congestion condition.

At decision diamond 186 the access network compares the measured metric, such as ROT, to the outerloop threshold. If the measured metric is greater than the outerloop threshold, the congestion bit is set at step 190, else the congestion bit is cleared at step 188. The access network compares the measured metric to the desired threshold at decision diamond 192. If the measured metric is greater than the desired threshold the outerloop threshold is adjusted by a value $\Delta$, at step 194; else the access network adjusts the outerloop threshold by a value $\delta$, at step 196. An adjusted value of the outerloop threshold is used by the access network to compare to a congestion metric in order to generate a congestion bit for a next congestion determination period. The access network transmits the congestion bit at step 198.

The value of $\Delta$ and the value $\delta$ are determined to maintain the outage probability to a desired level. The outage probability in one embodiment refers to the probability that a given congestion metric exceeds a desired threshold. Specifically, the ratio of ($\delta/\Delta$ controls the outage probability. For a given ($\delta/\Delta$ ratio, small values of $\delta$ and $\Delta$ result in less responsive congestion control, i.e., slower, and smoother. For a given ($\delta/\Delta$ ratio, large values of $\delta$ and $\Delta$ result in more responsive congestion control, however the more responsive control is also more erratic. The method adapts to changes in operating conditions, wherein the outage probability is maintained over changes in the operating conditions, including, but not limited to, the number of users, the target rates and channel conditions. In one embodiment, an outerloop threshold correction in a wireless communication system may be used to correct a cell's available capacity when the interference from neighboring cells changes due to dynamically varying load conditions in other cells.

Figure 4:
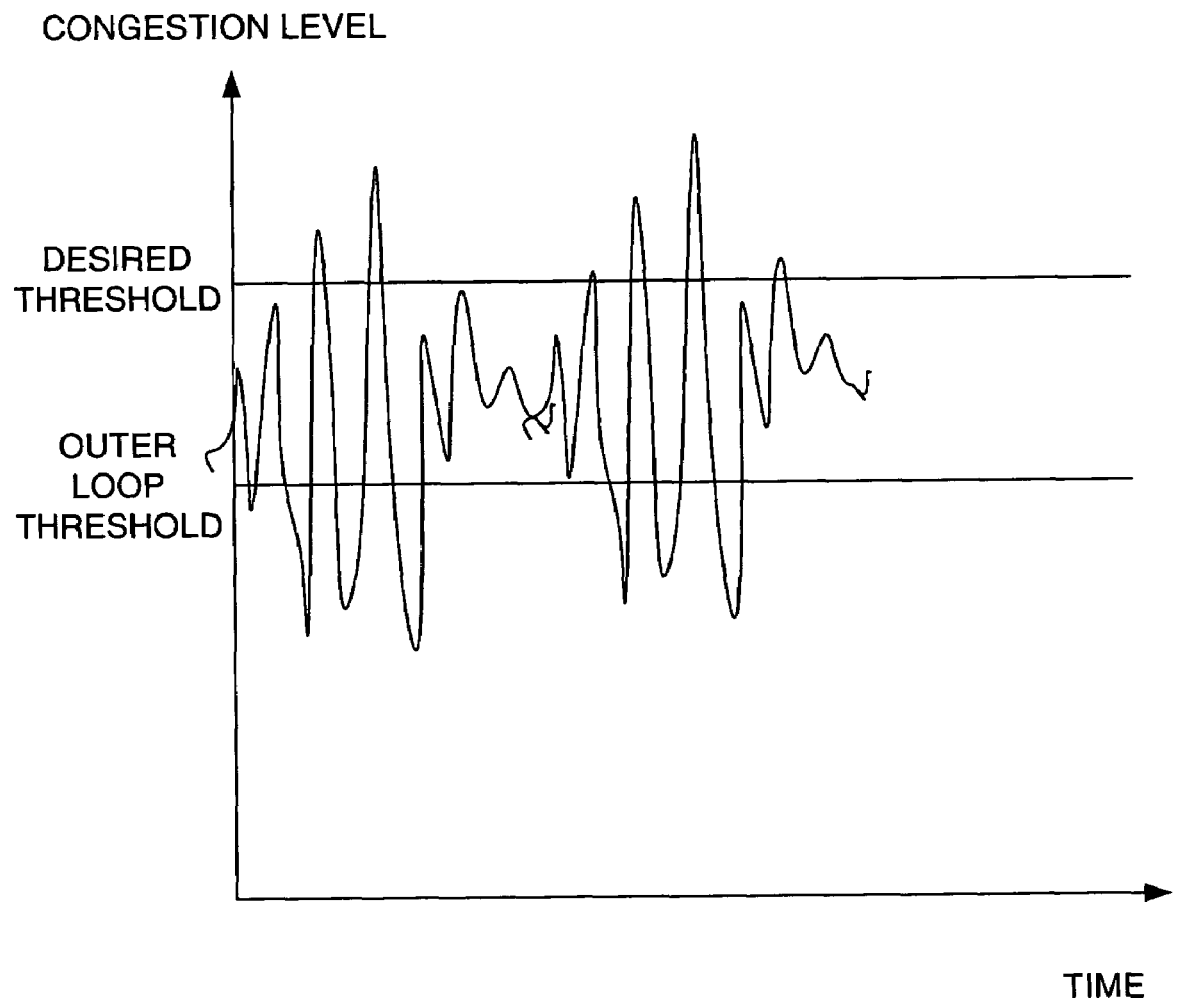
FIG. 4 is a timing diagram of an desired congestion threshold in relation to an outer loop congestion threshold.

As illustrated in FIG. 4, one embodiment sets an outer loop threshold having a margin with respect to a target threshold such that within a predetermined probability, transmission rates will not exceed the target threshold. In one embodiment, the outerloop threshold is calculated so as maintain the measured congestion metric, within the outage probability, to a desired level. Dynamic adjustment of the outerloop threshold is needed to accommodate varying conditions, including but not limited to, channel conditions and number of users.

Each access terminal receives the congestion bit and determines a transmission rate based thereon. In one embodiment, according to method 200 illustrated in FIG. 5A, the access terminal receives the congestion bit at step 202 and evaluates the congestion bit at decision diamond 204. For CB=1, processing continues to decision diamond 206 to handle an overload condition, else processing continues to decision diamond 214 to handle an underload condition. For the overload condition, the last rate is compared to a target at decision diamond 206. The target rate is determined specific to the access terminal. If the last rate is greater than the target rate, the rate is decreased at step 208 with a probability specific to the access terminal and specific to decreases in the rate. The probability is labeled Pd(i), wherein i is an index for the access terminals in the system, d corresponds to decrease probability, and each access terminal may have a unique probability. If the last rate was not greater than the target rate at decision diamond 206, the access terminal determines if there have been N consecutive CB=1 at decision diamond 210. If there have not been N consecutive CB=1, the access terminal applies the last data rate at step 212 to RL transmissions; else processing continues to step 208 to decrease the rate. In this way, the access terminal adjusts the data rate to maintain the transmission data rate below a target value. If the data rate is below the target and the access terminal has received a predetermined number N indications that the system is congested, the access terminal decreases the data rate. In this scenario, the access terminal is maintaining a data rate below a target specific to the access terminal, but the system is still overloaded, i.e., the congestion control of AT(i) is not reducing congestion sufficiently. The access terminal then transmits at the new rate at step 222.

Note that according to one embodiment the probability of adjusting at least one previous data rate, such as Pd(i), is a function of the data rate, wherein the probability for decreasing is given as Pd(i,R), and the probability of increasing is given as Pu(i,R). R refers to the last rate used by the access terminal, or may refer to a function of the historical data rate information. Lower probabilities for higher rates and higher probabilities for lower rates act to smooth the load variations experienced in the access network.

Figure 5A:
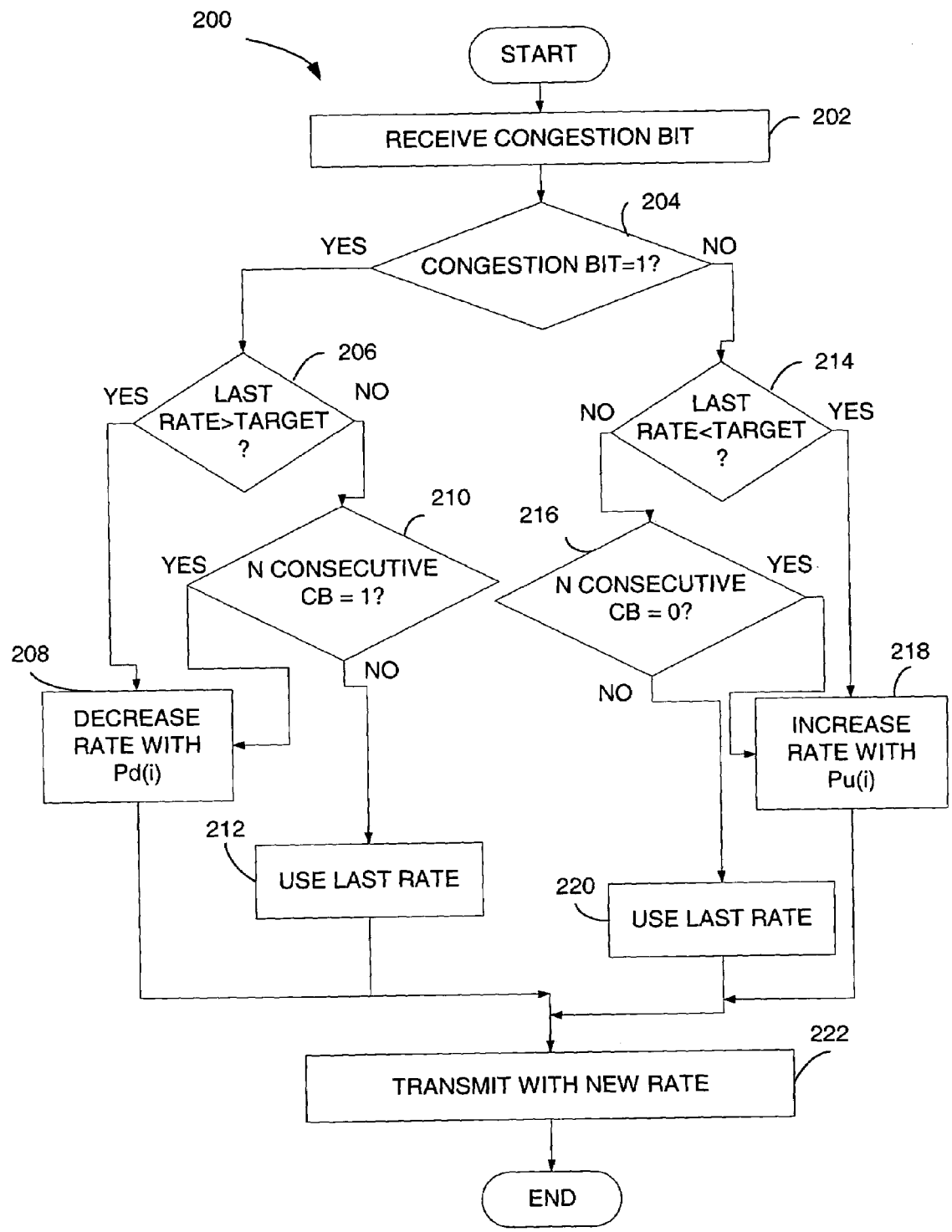
FIGS. 5A and 5B are flow charts of methods for congestion control at an access terminal in a wireless communication system adapted for packetized transmission.

Returning to decision diamond 204 of FIG. 5A, when the congestion bit is cleared, processing continues to decision diamond 214 for processing an underload condition. If the last rate is less than the target, the rate is increased at step 218 with a probability specific to the access terminal and specific to increases in the rate. The probability is labeled Pu(i), wherein the u corresponds to increase probability, and each access terminal may have a unique probability. If the last rate is not less than the target rate at decision diamond 214, the access terminal determines if there have not been N consecutive CB=0 at decision diamond 216. If the there have been N consecutive CB=0, the access terminal applies the last data rate at step 220 to RL transmissions; else processing continues to step 218 to increase the rate. In this way, the access terminal adjusts the data rate to maintain the transmission data rate as close to a target value as possible. If the data rate is above the target and the access terminal has received a predetermined number N indications that the system is not congested, the access terminal increases the data rate. In this scenario, the access terminal is maintaining a data rate above a target specific to the access terminal, but the system is still underloaded, i.e., the congestion control of AT(i) is not sufficiently utilizing the resources of the system. The access terminal then transmits at the new rate at step 222.

Figure 5B:
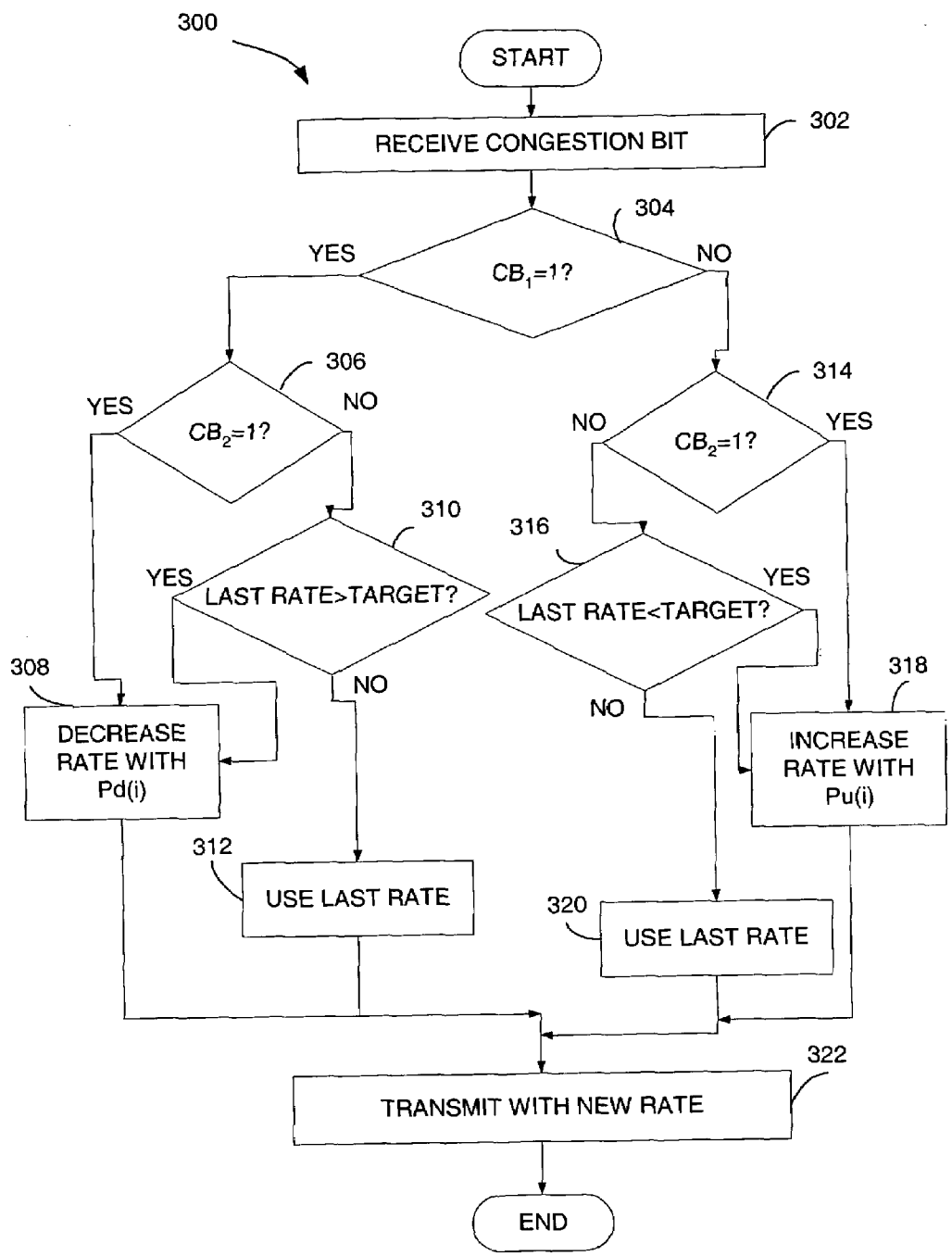

FIG. 5B illustrates an alternate embodiment for congestion control, wherein the congestion indicator includes multiple bits. The first bit(s) correspond to an adjustment indicator to indicate the direction of data rate adjustment, i.e., increasing or decreasing. At least one other bit corresponds to a target indicator and is used to indicate whether the mobile station is to use data rate targeting, i.e., always adjust or compare to a data rate target specific to the mobile station. In one embodiment, according to method 300 illustrated in FIG. 5B, the access terminal receives the congestion bit at step 302 and evaluates the adjustment indicator $CB_1$ at decision diamond 304. For $CB_1$=1, processing continues to decision diamond 306 to handle an overload condition, else processing continues to decision diamond 314 to handle an underload condition. For the overload condition, the process evaluates the target indicator $CB_2$ at decision diamond 306, wherein $CB_2$ indicates that the system is severely overloaded or underloaded depending on the value of $CB_1$. For a first value the mobile station is instructed to adjust the rate at step 308 without consideration of a target data rate. For a second value of $CB_2$ the mobile station compares the last rate to a target data rate at decision diamond 310. The target data rate is determined specific to the access terminal or mobile station. If the last rate is greater than the target rate, the rate is decreased at step 308 with a probability specific to the access terminal and specific to decreases in the data rate. The probability is labeled Pd(i), wherein i is an index for the access terminals in the system, d corresponds to decrease probability, and each access terminal may have a unique probability. If the last rate was not greater than the target rate at decision diamond 310, the access terminal uses the last rate at step 312. The access terminal then transmits at the new rate at step 322.

Returning to decision diamond 304 of FIG. 5B, when the congestion bit is cleared, processing continues to decision diamond 314 for processing an underload condition. At step 314 the target indicator $CB_2$ is evaluated. For a first value the mobile station is instructed to adjust the rate at step 318 without consideration of a target data rate. For a second value of $CB_2$ the mobile station compares the last rate to a target data rate at decision diamond 316. The target data rate is determined specific to the access terminal or mobile station. If the last rate is less than the target rate, the rate is decreased at step 318 with a probability specific to the access terminal and specific to decreases in the data rate. The probability is labeled Pu(i), wherein i is an index for the access terminals in the system, u corresponds to increase probability, and each access terminal may have a unique probability. If the last rate was not less than the target rate at decision diamond 316, the access terminal uses the last rate at step 320. The access terminal then transmits at the new rate at step 322.

The method 200 of FIG. 5A allows the use of a single congestion bit, wherein the processing is performed at the mobile station to determine if a predetermined number of congestion indicators have a same value. This processing requires the mobile station, and thus the system, to wait at least the predetermined number of times to receive the predetermined number of congestion indicators before the mobile station will force a data rate adjustment. In contrast, the method 300 of FIG. 5B offers a fast, responsive congestion control as the access network uses the target indicator to force a data rate adjustment at the mobile station. The mobile station thus receives sufficient information in the congestion indicator to make the congestion decision on receipt of a single congestion indicator. The increase in responsiveness of method 300 is at the expense of adding an additional bit or bits to the congestion indicator.

Alternate embodiments may implement other bit combinations or congestion indicator methods which allow data rate targeting at each mobile station, while also allowing a forced adjustment when the targeted adjustments are not sufficient to impact the overall system performance.

Alternate embodiments may implement alternate polarity schemes for identifying overload and underload conditions. Similarly, alternate embodiments may consider a history of previous data rates, wherein a next data rate is calculated as an adjustment to at least one previous data rate or is a statistical calculation based on the historical information. Additional steps and decision criteria may be added for congestion control specific to a desired system or user.

The methods and apparatus disclosed herein provide enhanced congestion control in a wireless communication system by adding data rate targeting of individual mobile stations or access terminals with a closed loop resource allocation control method. Additionally, congestion control may be further enhanced by directly controlling the probability of exceeding a desired congestion metric.

Figure 6:
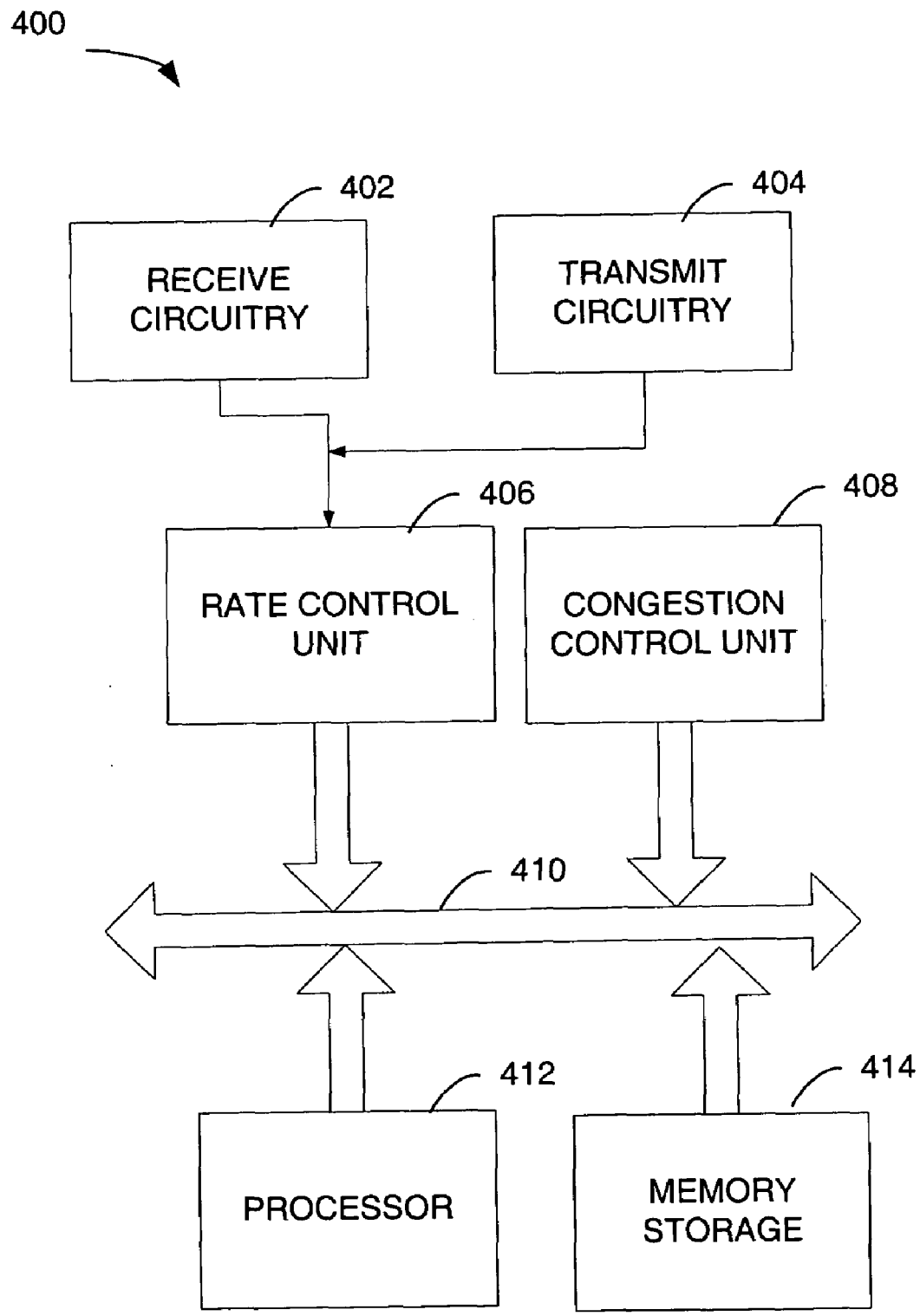
FIG. 6 is an access network in a wireless communication system.

FIG. 6 illustrates an access network 400 that is a transceiver having receive circuitry 402 and transmit circuitry 404 coupled to rate control unit 406. The AN 400 further includes a congestion control unit 408. The congestion control unit 408 measures the congestion level of transmissions and compares the congestion level to a threshold as described in FIG. 3. The AN 400 also includes a communication bus 410, a processor 412 and a memory storage 414. The operation of congestion control unit 408 and rate control unit 406 may be controlled by hardware within these units or may be controlled by software instructions stored in memory storage 414 and operated by processor 412. Calculation of a threshold value may be performed as described in FIG. 3, wherein the threshold is calculated and applied by congestion control unit 408. Alternate embodiments may implement the various functions of AN 400 with alternate control units and may combine functions within one unit.

Figure 7:
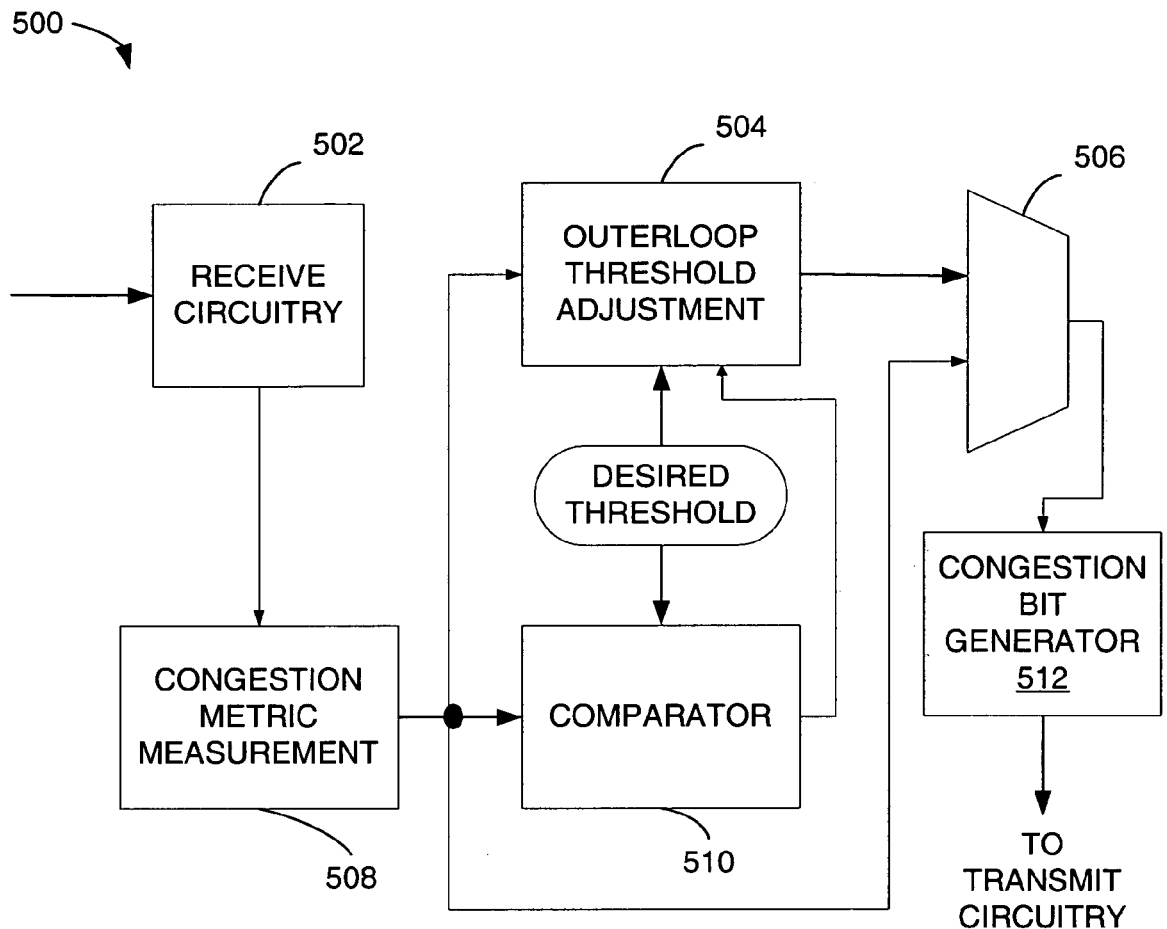
FIG. 7 is an access network for implementing congestion control as in FIG. 3.

FIG. 7 illustrates an access network 500 that is adapted to implement a congestion control method similar to the method illustrated in FIG. 3. Access network 500 includes receive circuitry 502 for radio frequency processing of a received signal. Receive circuitry 502 is coupled to congestion metric measurement unit 508. As in step 184 of method 180 of FIG. 3 the congestion metric measurement unit 508 may measure the ROT of received signals or may measure the cell loading, or some other metric indicative of the congestion condition of the system. The congestion metric measurement unit 508 provides the measurement results to outerloop threshold adjustment unit 504 and comparator 510. The output of congestion metric measurement unit 508 may provide the information in format(s) specific to the needs of each unit 504, 510. The outerloop threshold adjustment unit 504 also receives the desired threshold for determining a congestion condition. Note that in one embodiment a single target is used to indicate either overload or underload, however, alternate systems use multiple target values to indicate congestion levels. The outerloop threshold adjustment unit 504 initializes the outerloop threshold value as in step 182 of FIG. 3. The initialization sets the outerloop threshold equal to the desired threshold. The outerloop threshold adjustment unit 504 then adjusts the outerloop threshold value as in step 194 and 196 of FIG. 3. The outerloop threshold adjustment unit 504 also receives a result of the comparison of comparator 510, wherein the result determines the type of adjustment. In one embodiment, the outerloop threshold is decremented by different values depending on the result of the comparison of a measured congestion metric to the desired threshold in comparator 510, as in decision diamond 192 of FIG. 3. The outerloop threshold unit 504 is then coupled to the comparator 506, wherein the outerloop threshold generated by unit 504 is compared to the measured congestion metric of unit 508. The result determines the value of the congestion indicator, which in the present embodiment is a congestion bit and, therefore, the result determines the polarity of the congestion bit. The output of comparator 506 is provided to congestion bit generator 512.

Continuing with FIG. 7, the desired threshold is also provided to comparator 510, wherein the measured congestion metric of unit 508 is compared to the desired threshold. The result of comparator 510 is provided to unit 504 and determines the amount of adjustment to the outerloop threshold value. In this way, a margin is maintained between the outerloop threshold value and the desired threshold value.

Figure 8:
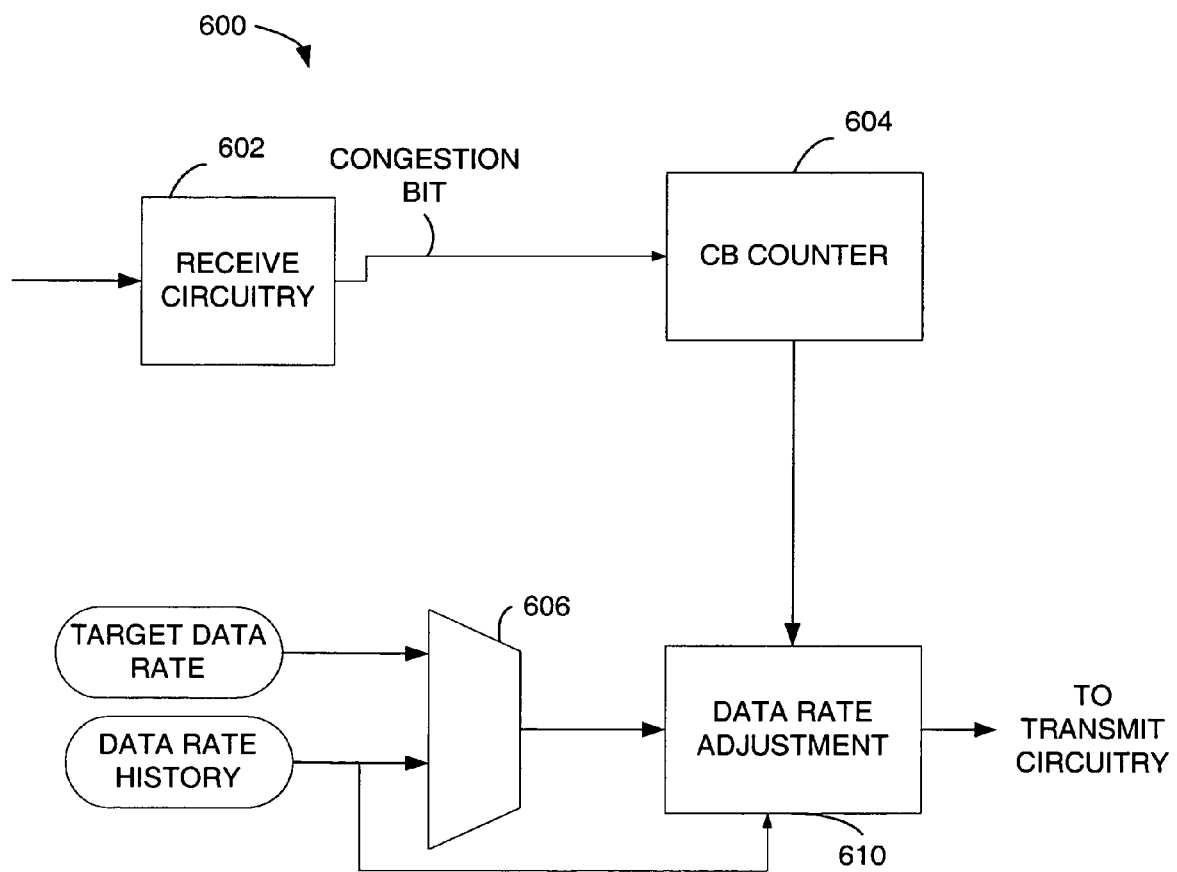
FIG. 8 is an access terminal for implementing data rate control as in FIG. 4.

FIG. 8 illustrates an access terminal 600 adapted to perform the method of FIG. 5A. The access terminal 600 includes receive circuitry 602 for radio frequency processing, wherein receive circuitry 602 provides the congestion bit to a congestion bit counter 604 and a comparator 606. The counter 604 tracks same valued consecutive congestion bits received at the access terminal 600. The counter 604 may be implemented in software, wherein the counter is cleared on receipt of a different value congestion bit.

The comparator 606 compares the last data rate to the target data rate and provides the result to data rate adjustment unit 610. The data rate adjustment unit applies a first control for congestion conditions and a second control for underload conditions. Congestion conditions are indicated by a first polarity of the congestion bit and underload conditions by an opposite polarity. The data rate adjustment unit 610 also receives a count value, i.e., the number of consecutive congestion bits having the same polarity of the current congestion bit. In response to the result of comparator 606 and the count value from unit 604, the data rate adjustment unit 610 adjusts the data rate. The count value is compared to a maximum number of allowable adjustments. As illustrated in steps 212 and 220 of FIG. 5A, if the count value is less than the maximum number, the access terminal maintains the last data rate. When the count value is equal to or greater than the maximum number, the access terminal adjusts the data rate consistent with the congestion bit information.

As described hereinabove, congestion control is enhanced by outerloop adjustment of a congestion threshold, wherein the adjustment applies a margin to the threshold having a predetermined probability of exceeding the threshold. According to one embodiment, the outerloop compares a measured congestion metric against an outerloop threshold and also against a desired threshold.

As described hereinabove, by providing specific data rate targets to each access terminal, congestion control is enhanced. Each access terminal responds to an overload condition, as indicated by a congestion indicator, by decreasing the last data rate so as to reduce the data rate below a target rate specific to the access terminal. When the access terminal is transmitting at a data rate below the target rate, the access terminal will respond to a congestion condition by using the last rate. If the system congestion is not relieved, the access terminal will decrease the data rate in an attempt to reduce system loading. In this situation, the access terminal decreases the data after receiving a predetermined number of system congestion indicators.

One embodiment applies the outerloop threshold adjustment method with the specific targeting of individual access terminals for determination of data rate. The access terminal may provide historical information to the access network, wherein the information is used for determining the outerloop threshold and or a desired threshold.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications by an access terminal via a communication channel with an access network, comprising:

receiving a first congestion indicator from said access network;

receiving a second congestion indicator prior to receiving said first congestion indicator;

determining a current transmission rate based on said first and second congestion indicators and a previous transmission rate; and transmitting data to said access network via said communication channel at said current transmission rate.

2. The method as in claim 1 wherein said determining said current transmission rate comprises determining said current transmission rate based further on a target transmission rate.

3. The method as in claim 1 wherein said determining said current transmission rate comprises determining said current transmission rate based further on whether a predetermined number of congestion indicators including said first and second congestion indicators have same values.

4. The method as in claim 3 wherein said determining said current transmission rate comprises adjusting said previous transmission rate based on a first scheme if said predetermined number of congestion indicators have same values, adjusting said previous transmission rate based on a second scheme if said predetermined number of congestion indicators do not have same values, and using said adjusted previous transmission rate as said current transmission rate.

5. The method as in claim 1 wherein each of said first and second congestion indicators comprises at least one data bit of information.

6. The method as in claim 1 wherein said determining said current transmission rate comprises determining said current transmission rate based further on a probability of decreasing said previous transmission rate if said first congestion indicator indicates overloading of said access network.

7. The method as in claim 1 wherein said determining said current transmission rate comprises determining said current transmission rate based further on a probability of increasing said previous transmission rate if said first congestion indicator indicates underloading of said access network.

8. The method as in claim 1 wherein said determining said current transmission rate comprises decreasing said previous transmission rate based on a first probability if said first congestion indicator indicates overloading of said access network, increasing said previous transmission rate based on a second probability if said first congestion indicator indicates underloading of said access network, and using said previous transmission rate, after said decreasing or increasing, as said current transmission rate.

9. The method as in claim 1 wherein said determining said current transmission rate comprises determining said current transmission rate based on a value of said first congestion indicator and whether said previous transmission rate is above or below a target transmission rate.

10. The method as in claim 9 wherein said determining said current transmission rate comprises determining said current transmission rate based further on whether a predetermined number of congestion indicators including said first and second congestion indicators have same values.

11. An apparatus for communications via a communication channel with an access network, comprising:

means for receiving a first congestion indicator from said access network;

means for receiving a second congestion indicator prior to receiving said first congestion indicator;

means for determining a current rate based on said first and second congestion indicators and a previous transmission rate; and means for transmitting data to said access network via said communication channel at said current transmission rate.

12. The apparatus as in claim 11 wherein said means for determining said current transmission rate comprises means for determining said current transmission rate based further on a target transmission rate.

13. The apparatus as in claim 11 wherein said means for determining said current transmission rate comprises means for determining said current transmission rate based further on whether a predetermined number of congestion indicators including first and second congestion indicators have same values.

14. The apparatus as in claim 13 wherein said means for determining said current transmission rate comprises means for adjusting said previous transmission rate based on a first scheme if said predetermined number of congestion indicators have same values, means for adjusting said previous transmission rate based on a second scheme if said predetermined number of congestion indicators do not have same values, and means for using said adjusted previous transmission rate as said current transmission rate.

15. The apparatus as in claim 11 wherein each of said first and second congestion indicators includes at least one data bit of information.

16. The apparatus as in claim 11 wherein said means for determining said current transmission rate comprises means for determining said current transmission rate based further on a probability of decreasing said previous transmission rate if said first congestion indicator indicates overloading of said access network.

17. The apparatus as in claim 11 wherein said means for determining said current transmission rate comprises means for determining said current transmission rate based further on a probability of increasing said previous transmission rate if said first congestion indicator indicates underloading of said access network.

18. The apparatus as in claim 11 wherein said means for determining said current transmission rate comprises means for decreasing said previous transmission rate based on a first probability if said first congestion indicator indicates overloading of said access network, means for increasing said previous transmission rate based on a second probability if said first congestion indicator indicates underloading of said access network, and means for using said previous transmission rate, after said decreasing or increasing, as said current transmission rate.

19. The apparatus as in claim 11 wherein said means for determining said current transmission rate comprises means for determining said current transmission rate based on a value of said first congestion indicator and whether said previous transmission rate is above or below a target transmission rate.

20. The apparatus as in claim 19 wherein said means for determining said current transmission rate comprises means for determining said current transmission rate based further on whether a predetermined number of congestion indicators including said first and second congestion indicators have same values.

21. An apparatus for communications via a communication channel with an access network, comprising:

a receive circuit for receiving a first congestion indicator from said access network and for receiving a second congestion indicator prior to receiving said first congestion indicator;

a data rate adjustment circuit connected to said receive circuit for setting a current transmission rate based on said first and second congestion indicators and a previous transmission rate; and a transmit circuit connected to said data rate adjustment circuit for transmitting data to said access network via said communication channel at said current transmission rate.

22. The apparatus as in claim 21 wherein said data rate adjustment circuit is further configured to determine said current transmission rate based further on a target transmission rate.

23. The apparatus as in claim 21 wherein said data rate adjustment circuit is further configured to determine said current transmission rate based further on whether a predetermined number of congestion indicators including said first and second congestion indicators have same values.

24. The apparatus as in claim 21 wherein each of said first and second congestion indicators includes at least one data bit of information.

25. A computer-readable medium having computer-readable instructions for causing an access terminal for:

receiving a first congestion indicator from an access network;

receiving a second congestion indicator prior to receiving said first congestion indicator;

determining a current transmission rate based on said first and second congestion indicators and a previous transmission rate; and transmitting data to said access network via a communication channel at said current transmission rate.

26. The computer-readable medium as in claim 25 wherein said medium is selected from a group consisting of RAM (Random Access Memory), flash memory, ROM (Read Only Memory), EPROM (Electrically Programmable Ready Only Memory), EEPROM (Electrically Erasable and Programmable Ready Only Memory), registers, hard drive, and CD-ROM (Compact Disk Read Only Memory).

* * * * *